Feb. 10, 1953 M. CAMRAS 2,628,285

ELECTROMAGNETIC TRANSDUCER HEAD

Filed Jan. 5, 1950 2 SHEETS—SHEET 1

Inventor
MARVIN CAMRAS
by The Firm of Russell Whitle(?) Attys.

Feb. 10, 1953 M. CAMRAS 2,628,285

ELECTROMAGNETIC TRANSDUCER HEAD

Filed Jan. 5, 1950 2 SHEETS—SHEET 2

Inventor
MARVIN CAMRAS by The Firm of Charles W. Hills Attys.

UNITED STATES PATENT OFFICE 2,628,285

ELECTROMAGNETIC TRANSDUCER HEAD

Marvin Camras, Chicago, Ill., assignor to Armour Research Foundation of Illinois Institute of Technology, Chicago, Ill., a corporation of Illinois Application January 5, 1950, Serial No. 137,001

15 Claims. (Cl. 179—100.2)

This invention relates to an electromagnetic transducer head and, more particularly, to a head for magnetic recording and reproducing apparatus which employs an extra magnetic pole in the recording head, in addition to the two poles normally employed.

In one type of magnetic recording apparatus, a lengthy magnetizable record medium is drawn across an electromagnetic transducer head assembly at substantially uniform linear velocity. The head assembly includes a magnetic core member having a non-magnetic gap over which the medium passes and which is provided with suitable current-conducting exciting elements to produce a magnetic field across the gap. The pole portions of the core member which form the non-magnetic gap are so positioned and arranged that the medium passes over first one pole, then across the gap, and then over the other pole.

During the recording operation, current is caused to flow in exciting elements in accordance with time variations of an intelligence to produce a time-varying magnetic field in the core and in accordance with the value thereof. The lengthy magnetizable medium is subjected to the influence of this field as it is drawn therethrough, and magnetization is imparted to incremental lengths of the medium in accordance with the time variations of the intelligence, thus causing variations in the magnetization of the medium along its length in accordance with the time variations of the intelligence.

During reproduction, the lengthy magnetizable medium is drawn across the same or similar head assembly to set up a flux in the core portion thereof in accordance with the magnetization of the medium along successive incremental lengths as it passes across the gap of the magnetic core member. The resultant time-varying flux induces a voltage in the coil with which the flux is linked in accordance with the time rate of change thereof. This voltage may be amplified and suitably reproduced by a loud speaker or similar device to produce the intelligence recorded.

This magnetic recording and reproducing inherently involves the conversion of an intelligence to a time-varying magnetic field during the recording operation, and the conversion of a time-varying magnetic flux into an intelligence in the reproducing operation.

It has been found in practice that one of the limitations on how high a frequency you can record and how well you can record any frequency depends, to a considerable degree, on how rapidly the magnetic intensity decreases at the trailing pole of the electro-magnetic transducer head after the record medium has crossed the gap.

One of the principal features and objects of the present invention is to provide a novel electro-magnetic transducer head assembly which employs an extra pole. It has been found with an extra pole and properly excited that the magnetic intensity may be caused to drop off much more rapidly at the trailing pole after the record medium has crossed the gap, and also causes a more uniform rate of intensity drop to exist throughout the thickness of the magnetic record medium than has heretofore been possible. It has further been found that with this extra pole it is possible to record any recordable frequency better and also to record higher frequencies because the magnetic intensity gradient is steeper in the effective region of recording.

A further object of the present invention is to provide a novel method and means for magnetically recording intelligence on a magnetizable record member.

A still further object of the present invention is to provide a novel electromagnetic transducer assembly.

A still further object of the present invention is to provide a novel method and means for erasing a previous magnetic record on a magnetizable record medium.

A still further object of the present invention is to provide a novel electromagnetic transducer head assembly in which a region of greatest magnetic intensity in the high frequency bias field applied to the head is at a different location from the region of greatest magnetic intensity of the audio field.

Other objects and features which I believe to be characteristic of my invention are set forth with particularity in the appended claims. My invention itself, however, both as to its organization, manner of construction, and method of operation, together with further objects and advantages thereof may best be understood by reference to the following description taken in connection with the accompanying drawings, in which:

Figures 1, 2, 3, 4, 5, 6, 7, 8, 9:
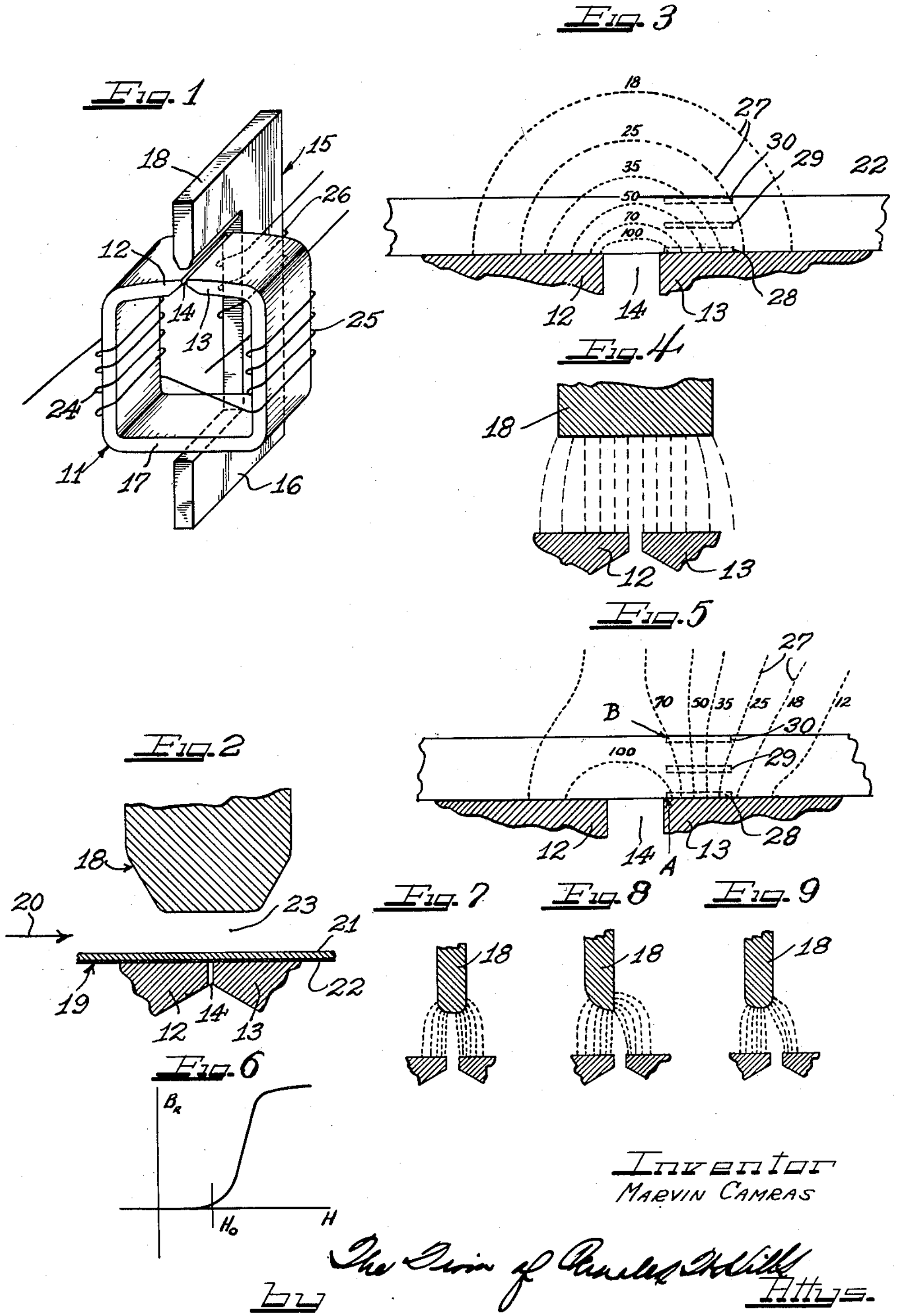
Figure 1 is a diagrammatic view of an electro-magnetic transducer head assembly embodying the novel teachings and principles of the present invention.
Figure 2 is a fragmentary, front elevational view of the pole tips of the three poles of the head assembly shown in Figure 1 with a record medium, in section, shown as passing over the two main poles.
Figure 3 is a diagrammatic drawing showing lines of equal magnetic intensity in a head assembly which does not employ a third pole.
Figure 4 is a drawing similar to Figure 3 showing a three-pole arrangement but with only the third pole excited.
Figure 5 shows a plot of lines of equal magnetic intensity when both the main poles as well as the third pole are excited and, in effect, shows the combination of Figures 3 and 4.
Figure 6 is a plot of an initial magnetization curve showing the location of $H_o$.
Figures 7, 8 and 9 are diagrams of different shapes of pole tips which may conveniently be employed in a three-pole type of electromagnetic transducer head assembly.

The first embodiment of the present invention is illustrated in Figures 1 and 2 of the drawings, and as shown therein, an electromagnetic transducer head assembly includes a generally ring-shaped core member 11 having two confronting pole portions 12 and 13 with a small non-magnetic gap 14 lying therebetween. This core member 11 is formed of any suitable magnetic material having high permeability, a high saturating characteristic but very low magnetic retentivity. A third C-shaped core piece 15 is provided having a base or lower leg portion 16 which abuts the base part 17 of the core member 11 and an upper leg or pole portion 18 which is disposed in spaced overlying relationship with respect to the gap 14.

As may be seen best in Figure 2 of the drawings, a magnetizable record member 19 is arranged to travel across and in contact with the poles 12 and 13 in the direction as indicated by the arrow 20. The magnetizable record member may conveniently be in the form of a paper tape or plastic backing 21 with a thin layer of magnetizable material 22 on the undersurface thereof and in contact with the poles 12 and 13. The magnetizable material 22 may be of any suitable or convenient form having a relatively high coercive force.

As is diagrammatically illustrated in Figure 2, the gap 14 between the poles 12 and 13 is relatively small. In practice, it has been found that this gap may conveniently be of the order of magnitude of .0002'' to .002''. The gap 23 lying between the third pole 18 and the poles 12 and 13 is much larger by comparison, it being preferable from a mechanical standpoint that this pole does not lie in contact with the record medium 19. By way of example, and not by way of limitation, this gap 23 may be approximately .010'' when the main gap is approximately .001''.

The main core portion is provided with a winding having one portion 24 on one leg and a second portion 25 on the other leg. The coil portions 24 and 25 are symmetrical and arranged to act in aiding relation in setting up a flux flowing through the core 11 but which act in hum-bucking relation with regard to stray field pickup when the head is acting as a reproducer. The core portion 15 which provides the third leg or pole portion 18 has a coil 26 wound thereon.

The coil portions 24 and 25 of the main core and the coil 26 are electrically connected together, either in series or in parallel, in such a manner that at any given instant of time the third pole 18 is of the same polarity as the trailing pole 13 and in opposite polarity with respect to the leading pole 12 of the main core 11.

In this first embodiment of the present invention which is being described, the audio current fed to the coil portions 24 and 25 and to the coil 26 may have superimposed thereon a high frequency bias current in a manner such, for example, as that described in my issued Patent No. 2,351,004, granted June 13, 1944. The actual effect and advantage of the third leg in the electromagnetic transducer head assembly may best be understood by consideration of Figures 3, 4 and 5.

Referring first to Figure 3, this figure shows the portions of the poles 12 and 13 adjacent the top of the gap 14, and indicates by the dotted lines, regions of equal magnetic intensity 27. For example, line 27 of equal magnetic intensity having the numeral 18 immediately above it, represents a region in space along the line where the magnetic intensity is 18 units. The line 25 represents the line where at every place along the line the magnetic intensity is 25, etc.

Particular care and attention must be given to the fact that these are not flux lines and, for that reason, they do not indicate the direction of the magnetic field, but only the intensity of the magnetic field. It is to be noted that in the conventional flux plot, the flux lines indicate the direction of the magnetic field, while the relative intensity of the magnetic field is given only by the relative spacing between adjacent flux lines. Since it is actually the magnetic intensity which is the all important thing in making a recording, a plot of magnetic intensity lines rather than a flux plot is the type of plot which will best illustrate the features of the invention.

As is well known to those skilled in the art, it is important to have high magnetic intensity at the place where the record medium leaves the region of the gap and that the magnetic intensity thereafter rapidly fall. It is furthermore desirable that the rate of fall near the portion of the tape which is immediately adjacent the trailing pole be as close as possible to the rate of fall of magnetic intensity adjacent the other side of the magnetizable material but at the same location along the length of the tape.

As shown in Figure 3 of the drawings, only the magnetic layer of material 22 of the tape is shown. Furthermore, as shown in Figure 3, no energy is supplied to the coil of the third pole, and for that reason, Figure 3 represents a plot of magnetic intensity for a normal two-pole head wherein the tape is longitudinally magnetized. For purposes of illustration, three incremental portions 28, 29 and 30 have been shown in the tape. The incremental portions are of the same length along the length of the tape, but are located at different distances away from the top surface of the trailing pole 13. The incremental portion 28 has a much more rapid fall-off in magnetic intensity than does the incremental portion 30. It will furthermore be observed that there is a very substantial difference in the magnitude of the magnetic intensity in the region of the incremental portion 30 just after it has passed the gap 14 than there is in the incremental portion 28. If this drop-off in magnetic intensity could take place closer to the gap 14, or in other words, have the lines of magnetic intensity as shown bunched closer together, a much better recording would take place and it would also be possible to record higher frequencies.

As will now be explained, this is possible by the addition of the third pole 18. In order to understand the effect of the super-position of the third pole 18, I have shown in Figure 4 what the magnetic intensity plot would look like with the coil 26 energized but the coils 24 and 25 deenergized. Here, the lines of magnetic intensity are more nearly the same as the flux plot lines.

When the coil 26 is now energized along with the coils 24 and 25 so that the pole 18 is of opposite polarity with respect to the pole 12, but of the same polarity as the pole 13, the tendency is to flatten the flux pattern out over the trailing pole portion 13 and tends to make it more nearly perpendicular over the pole portion 12. The effect on the magnetic intensity pattern, however, is shown in Figure 5.

As will be observed from a study of Figure 5, the magnetic intensity lines 27 show that there is a much more rapid gradient or drop-off over the trailing pole 13 in the region of the gap 14, and furthermore, the rate of drop-off is nearer the same at the region of the record member most remote from the pole portion 13 as compared with that lying immediately adjacent the pole portion 13.

From the above, it will be apparent that not only is the field more nearly longitudinal, but is also decreasing more rapidly where the tape leaves the gap. Furthermore, it is to be noted that the sharply changing field extends for a greater distance laterally than with the conventional head. For that reason, tape contact with the head does not have to be as perfect. It has also been found that the recording process is less sensitive to changes in bias or to excess bias, and, in addition, the optimum bias for high and low frequencies is practically the same. This latter feature is, of course, of tremendous advantage, for one of the great difficulties in the past with the use of high frequency bias has been the fact that the optimum bias for high audio notes has been substantially different than the optimum bias for low frequency notes.

It has furthermore been found in practice with this type of a head that high frequencies can be recorded at higher intensities without distortion than with conventional heads. The tendency to produce "beat" notes between the bias and audio frequency is reduced. The gradient of the recording field near the gap can be varied by adjusting the intensity of the cross field. For example, increasing the cross field would give a greater gradient at the corner of the trailing pole 13 at the region marked A, but the region at B will suffer in comparison.

In determining the optimum cross field, some of the factors to be considered are the size of the recording gap, thickness of the layer of magnetizable material 22, and the magnetic properties of the material used to form the layer 22. Under typical operating conditions, it has been found advantageous to use a cross field which is approximately the value at which recording starts to take place, or a value at $H_o$ on the $B_r$–H curve (see Figure 6).

As shown in Figure 6, the point $H_o$ is the point on the $B_r$–H curve where $B_r$ begins to rise rapidly with increasing H. With ordinary tape coatings, $H_o$ is about ⅓ to ½ of the coercive force of the material, although it has been found in some cases it may be as low as $\frac{1}{10}$ of the coercive force, and in others, it may be practically equal to the coercive force.

Figures 7, 8 and 9 show the effect of variations in the shape of the pole tip on the pole 18.

Figures 10, 11:
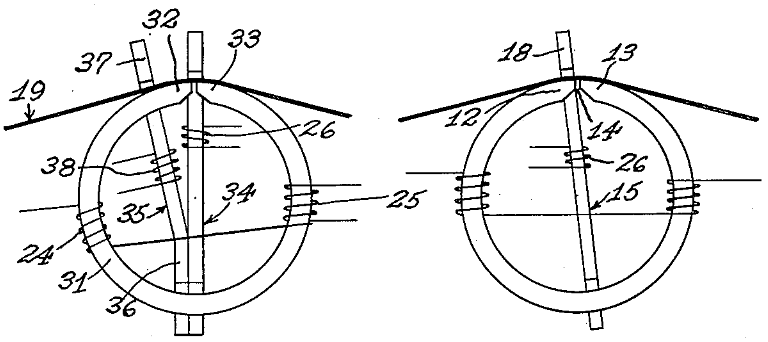
Figure 10 is a diagrammatic view of an electromagnetic transducer head assembly illustrating a four-pole head construction, the extra pole being employed for erasing.
Figure 11 is a diagrammatic view showing how the third pole of the form of the invention shown in Figure 1 may be shifted lengthwise of the tape so that it may be employed for erasing as well as for providing high frequency bias.

In Figure 10 of the drawing, a modified form of head construction is shown in which two auxiliary yokes are used instead of one. More particularly, the head construction shown in Figure 10 includes a main core portion 31 having confronting pole portions 32 and 33. A C-shaped auxiliary yoke or core member 34 similar to the auxiliary core portion 15 shown in Figure 1 of the drawings is provided. In addition, there is also provided a C-shaped core member 35 similar to the member 34, but being bent at a point part-way up its back leg 36 so that the upper portion of this core member 35 lies in a plane at an angle to the core portion 34. The core member 35 has an upper pole 37 which overlies the record member 19. A winding 38 is provided on the core portion 35 and is of sufficient number of turns to provide an intense magnetic field in the region of the pole portion 37 so as to demagnetize the record member 19 as it passes thereunder. The coil 38 may be connected with the coil 26, or may be separately excited as desired.

In Figure 11 of the drawings, I have shown diagrammatically a head of the type shown in Figure 1 but with the core member 15 tipped slightly so that the pole 18 is over the leading pole 12 rather than over the gap 14. When a coil 26 is of sufficient number of turns and energized in a manner to provide a strong high frequency field between the pole 18 and the pole 12, an erase field is set up which will demagnetize the tape before reaching the gap 14, but provides a sufficient cross field of proper strength in the region of the gap itself to provide the desired high frequency bias. If desired, the auxiliary pole may be excited with a high frequency bias field only, while the main poles are excited with audio frequency only.

Figure 12:
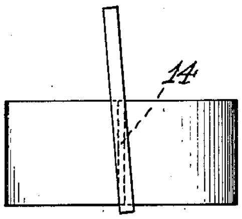
Figure 12 is a diagrammatic top view showing how the third pole may be shifted angularly with respect to the gap to change the frequency response characteristic of the assembly.

In Figure 12 of the drawings, I have indicated that the plane of the core member 15 may be displaced angularly with respect to the gap 14, thereby to change the frequency response across the width of the tape. The arrangement which gives the sharpest drop in magnetic intensity at the trailing pole will give the best high frequency response.

Figure 13:
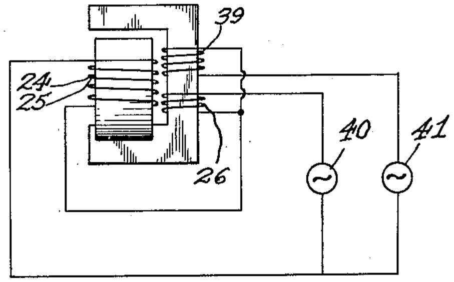
Figure 13 is a diagrammatic end view of a head assembly of the type shown in Figure 1 but showing an electrical connection therefor which provides a region of maximum gradient in magnetic intensity for the audio signal adjacent the trailing pole but providing the region of maximum gradient in magnetic intensity of the high frequency bias field adjacent the leading pole of the assembly.

In Figure 13 of the drawings, I have shown how the head of Figure 1 may be provided with a second winding 39 and then connected in such a manner as to give an intense audio field on one side of the gap and an intense bias field on the other side of the gap.

More particularly, in Figure 13, I have indicated a source of audio current at 40 and a source of high frequency current at 41. The coils 24 and 25 are connected in series with the winding 26 to the source 40 of audio frequency, while the coils 24—25 are connected in series with the winding 39 to the source 41 of high frequency current. The coils 39 and 26 are oppositely polarized with respect to the coils 24—25. More specifically, these coils are so connected that with respect to the audio frequency, the auxiliary pole 18 is of the same polarity as the trailing pole 13, but with respect to the high frequency field, the auxiliary pole 18 is of the same polarity as the leading pole 12. This causes the most rapidly changing audio field to exist on the side of the gap near the trailing pole, but the rapidly changing bias field to exist on the side of the gap adjacent the leading pole. The reverse effect may, of course, be obtained by reversing the polarity of the coils 26 and 39.

Figure 14:
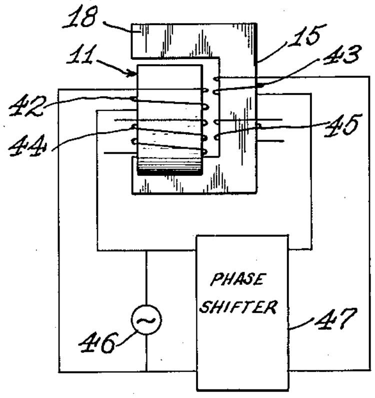
Figure 14 is a diagrammatic view similar to Figure 13 but showing a wiring arrangement for obtaining a rotating high frequency bias field in the head assembly.
Figure 15:
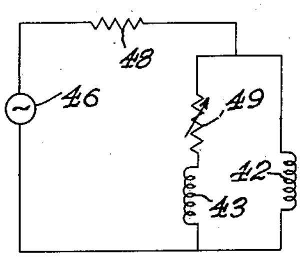
Figure 15 is an electric network diagram of the arrangement shown in Figure 14.

In Figure 14 of the drawings, I have shown an arrangement wherein the high frequency bias is supplied to the main core portion and to the auxiliary core portion through one set of windings, and the audio current is supplied through a separate set of windings. The high frequency bias supplied to the first set of windings is displaced 90° in phase with respect to each other, thereby to produce a rotating high frequency magnetic field. More specifically, the main core portion 11 has a high frequency bias winding 42 thereon, while the auxiliary core portion 15 has a high frequency bias winding 43 thereon. In addition, the core portion 11 has an audio winding 44, while the core portion 15 has an audio winding 45 thereon. The audio frequency is fed to the coils 44 and 45 in such a manner that the third pole 18 is of the same polarity as the trailing pole 13. The high frequency bias windings 42 and 43, however, are fed from a source of high frequency bias 46 in the manner illustrated. More particularly, the high frequency bias current is fed directly to the winding 42 but is fed through a phase-shifting network 47 to the winding 43. This electrical arrangement is shown diagrammatically in Figure 15 of the drawings.

The source 46 is connected to the coil 42 through a fixed resistance element 48 and is connected to the winding 43 through the fixed resistance element 48 and a variable resistance element 49. The resistance 48 is inserted in the circuit so that it is possible to obtain a more nearly constant current in the external circuit. The variable resistance 49 in series with the coil 43 produces a phase-shift with respect to the current flowing through the coil 42 in a manner well known to those skilled in the art. By this arrangement, a rotating high frequency magnetic field is obtained in the tape by combining out-of-phase fields at right angles to each other.

While the use of a third pole has many advantages as will be apparent from the foregoing description, its greatest advantage probably lies in the improvement of the play-back operation.

It will be understood that modifications and variations may be effected without departing from the scope of the novel concepts of the present invention.

I claim as my invention:

1. An electromagnetic head comprising a pair of poles having pole tips in closely spaced confronting relation and arranged to have a magnetic record member pass thereacross from one pole to the other, means for establishing an alternating magnetic field in the region of said pole tips, and means for establishing a secondary alternating magnetic field in the region of said pole tips to change appreciably the net intensity and configuration of said field in the region of one of said pole tips as compared with the intensity of said field in the region of the other of said pole tips.

2. An electromagnetic transducer comprising a ring-type core having a pair of closely spaced confronting pole portions separated by a non-magnetic gap across which a magnetic record member is arranged to pass first over a first one of said pole portions and then the gap and finally over a second one of said pole portions, a second core in the region of said gap and spaced from said confronting pole portions and having a third pole portion spaced above said non-magnetic gap and within the magnetic influence of said first and second pole portions, said ring-type core and said second core having magnetic core elements common to both cores, means for setting up an alternating magnetic flux in said first core thereby to establish an alternating magnetic field in the region of said gap, and means for setting up an alternating magnetic flux in said second core which passes through said third pole portion and at least one of said pole portions of said first core.

3. An electromagnetic head comprising a pair of poles having pole tips in closely spaced confronting relation and arranged to have a magnetic record member pass thereacross from one pole to the other, means for establishing an alternating magnetic field in the region of said pole tips, and means for substantially increasing the net intensity of said field in the region of the pole tip which is reached second as the record member passes across first one pole and then the other.

4. An electromagnetic head comprising a pair of poles having pole tips in closely spaced confronting relation and arranged to have a magnectic record member pass thereacross from one pole to the other, means for establishing an alternating magnetic field in the region of said pole tips, and means for substantially increasing the intensity of said field in the region of the pole tip which is reached first as the record member passes across first one pole and then the other.

5. An electromagnetic head comprising a core having a pair of poles in closely spaced confronting relation arranged to have a record medium pass thereacross from one pole to the other and substantially in contact therewith, a second core member having a third pole mounted in proximity to said pair of poles but spaced from said record medium as said record medium travels across said pair of poles, means causing an alternating magnetic flux to flow in said first core, and means for causing an alternating magnetic flux of the same frequency to flow in said second core, said second means being phased with respect to said first means so that the instantaneous magnetic polarity of said third pole is the same as the second pole which the record member crosses.

6. An electromagnetic head comprising a core having a pair of poles in closely spaced confronting relation arranged to have a record medium pass thereacross from one pole to the other and substantially in contact therewith, a second core member having a third pole mounted in proximity to said pair of poles but spaced from said record medium as said record medium travels across said pair of poles, means causing an alternating magnetic flux to flow in said first core, and means for causing an alternating magnetic flux of the same frequency to flow in said second core, said second means being phased with respect to said first means so that the instantaneous magnetic polarity of said third pole is the same as the first pole which the record member crosses.

7. An electromagnetic transducer comprising a ring-type core having a nonmagnetic gap therein across which a magnetic record member is arranged to pass, a C-shape core straddling said ring-type core, one end of said C-shape core being disposed over said gap and in spaced relation to said ring-type core, the other end of said C-shape core being substantially in contact with said ring-type core at a point remote from said gap, and at least one electric coil on each of said cores.

8. An electromagnetic transducer comprising a ring-type core having a pair of closely spaced confronting pole portions separated by a non-magnetic gap across which a magnetic record member is arranged to pass first over a first one of said pole portions and then the gap and finally over a second one of said pole portions, a second core having a pole portion spaced above said non-magnetic gap and within the magnetic influence of said first and second pole portions, means for setting up an alternating magnetic flux in said first core thereby to establish an alternating magnetic field in the region of said gap, and means for setting up an alternating magnetic flux in said second core which passes through said third pole portion and at least one of said pole portions of said first core, said fluxes being phased with respect to each other in such a manner that the instantaneous polarity of said third pole portion is substantially the same as said second pole portion and opposite to said first pole portion.

9. An electromagnetic transducer comprising a ring-type core having a pair of closely spaced confronting pole portions separated by a non-magnetic gap across which a magnetic record member is arranged to pass first over a first one of said pole portions and then the gap and finally over a second one of said pole portions, a second core having a pole portion spaced above said non-magnetic gap and within the magnetic influence of said first and second pole portions, means for setting up an alternating magnetic flux in said first core thereby to establish an alternating magnetic field in the region of said gap, and means for setting up an alternating magnetic flux in said second core which passes through said third pole portion and at least one of said pole portions of said first core, said fluxes being phased with respect to each other in such a manner that the instantaneous polarity of said third pole portion is substantially the same as said first pole portion and opposite to said second pole portion.

10. An electromagnetic head comprising a core having a pair of poles in closely spaced confronting relation arranged to have a record medium pass thereacross from one pole to the other and substantially in contact therewith, a second core member having a third pole mounted in proximity to said pair of poles, means causing an alternating magnetic flux to flow in said first core, and means for causing an alternating magnetic flux of the same frequency to flow in said second core but out of phase with said first flux.

11. An electromagnetic head comprising a core having a pair of poles in closely spaced confronting relationship arranged to have a record medium pass thereacross from one pole to the other and substantially in contact therewith, a second core member having a third pole mounted in proximity to said pair of poles and over the gap between the confronting portions of said pair of poles, said third pole being spaced from said pair of poles thereby to provide a gap through which said record medium passes as it crosses said pair of poles, a third core member having a fourth pole mounted in proximity to but spaced from said one pole of said pair of poles, said fourth pole being spaced from said one pole to provide a gap through which said record medium travels as it crosses said one pole, means causing an alternating magnetic flux to flow in said first core, and means for causing an alternating magnetic flux to flow in said second core, and means for causing an alternating magnetic flux to flow in said third core.

12. An electromagnetic transducer comprising a ring-type core having a non-magnetic gap therein across which a magnetic record member is arranged to pass, a C-shape core straddling said ring-type core, one end of said C-shape core being disposed over said gap and in spaced relation to said ring-type core, the other end of said C-shape core being substantially in contact with said ring-type core at a point remote from said gap, said C-shape core lying in a plane disposed at an acute angle to the plane of said ring-type core, and at least one electric coil on each of said cores.

13. An electromagnetic head comprising a pair of poles having pole tips in closely spaced confronting relation and arranged to have a magnetic record medium pass thereacross from one pole to the other, means for establishing a magnetic field of fluctuating intensity between and in the region of the confronting portions of said poles, means for superimposing a high frequency fluctuating magnetic field on said first magnetic field, said means being constructed and arranged to cause a higher instantaneous value of high frequency field in the region of the entering pole of said pair of poles and for causing a higher instantaneous value of said first magnetic field in the region of the trailing pole of said pair of poles.

14. The method of magnetic recording which includes passing a magnetizable record medium through an alternating magnetic field and modifying the direction and intensity of said field in one portion thereof by establishing a second alternating magnetic field having a different direction than the first field as said record medium passes therethrough.

15. The method of establishing a more rapidly decreasing magnetic intensity in the region of a magnetic recorder head wherein magnetization of a magnetizable medium moving relative to and through said region is to occur, the medium moving through a first portion of said region and then through a second portion of said region, and wherein the head is adapted to establish a first concentrated alternating magnetic field in said region, the magnetic intensity of said first field decreasing from said first portion to said second portion, which comprises the step of imposing on said second portion a second alternating magnetic field having a component which has a phase, frequency, intensity and configuration in opposition to said first concentrated field in said second portion, thereby providing a sharper gradient in the region and improved high frequency recording.

MARVIN CAMRAS.

REFERENCES CITED

The following references are of record in the file of this patent:

UNITED STATES PATENTS

| Number | Name | Date |
|---|---|---|
| 2,272,821 | Roys | Feb. 10, 1942 |
| 2,456,767 | Camras | Dec. 21, 1948 |
| 2,484,568 | Howell | Oct. 11, 1949 |

FOREIGN PATENTS

| Number | Country | Date |
|---|---|---|
| 805,434 | France | Aug. 22, 1936 |
| 881,343 | France | Jan. 22, 1943 |